April 5, 1966 L. J. COOPER 3,244,164
SPACE HEATER
Filed April 3, 1963
FIG_1
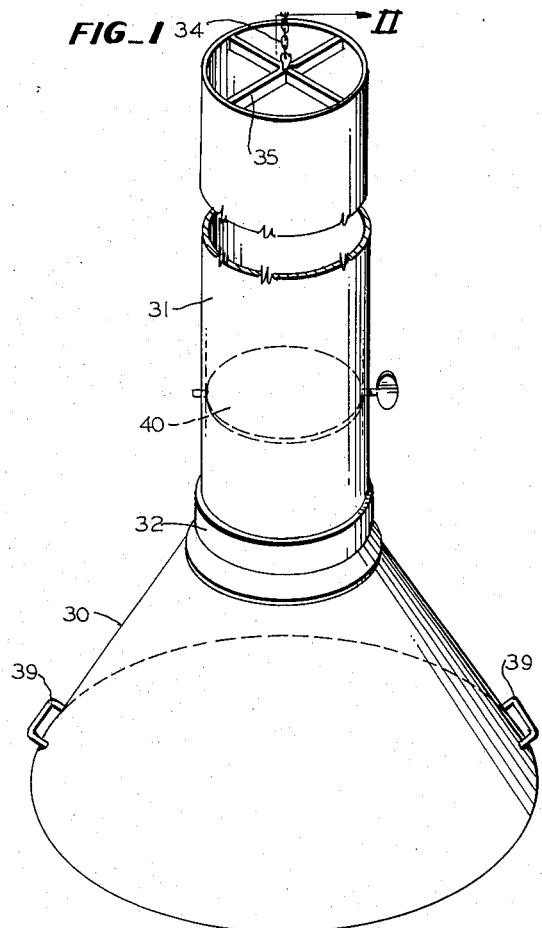
FIG_2
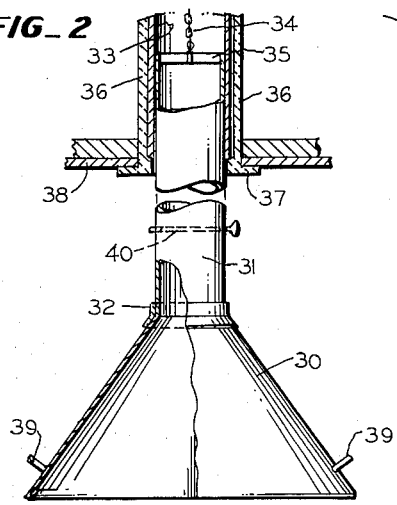
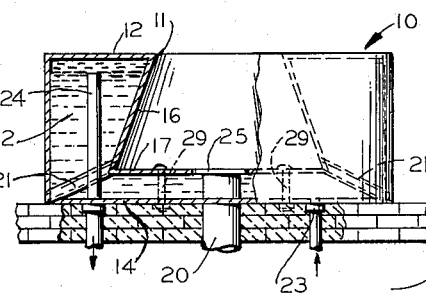
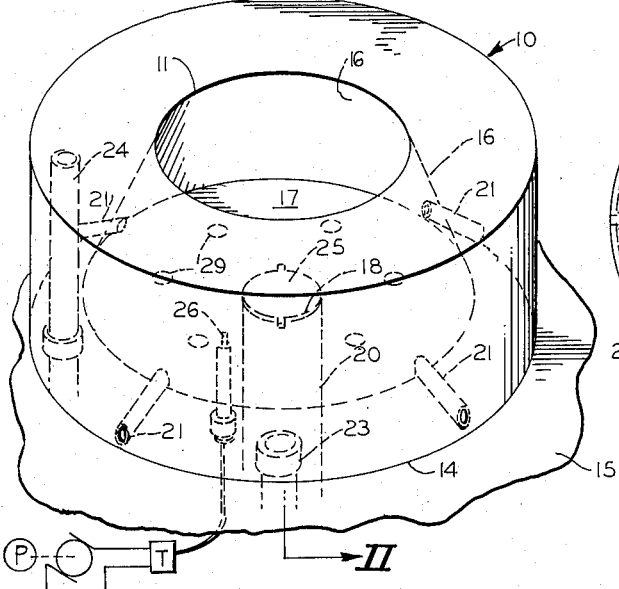
FIG_3
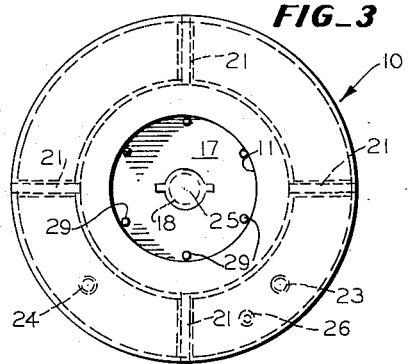
INVENTOR.
LEO J. COOPER
BY *Henry Gifford Hardy*
ATTORNEY 3,244,164
SPACE HEATER
Leo J. Cooper, 151 Josiah St., San Francisco, Calif.
Filed Apr. 3, 1963, Ser. No. 270,236
6 Claims. (Cl. 126—58)

The present invention is directed to space heaters, and particularly to space heaters which combine a hot water jacket not only for supplying hot water for domestic use, but which supplies an insulating medium to maintain the fire in the firebox much longer than ordinarily would be expected, conserving fuel and extending the maximum heating period.

It is an object of the present invention to provide a space heating element which has the unique characteristic of burning with a central flame like a candle, giving the same kind of effect.

It is also an object of the present invention to produce a space heating unit which has a water jacket supplying hot water for various household uses as well as providing an insulating jacket which maintains the heat for a longer period of time than would normally be expected.

Still another object of the invention is to produce a space heater where the flame only is visible with the remainder of the fire normally being obscured from view.

It is another object of the present invention to provide a space heater where the usual solid fuel will be conserved and which produces space heating of a longer lasting period because of the nature and shape of the surrounding water jacket.

Also an object of the invention is to provide a space heater wherein the hot water may be circulated as required through pipes to other locations and rooms, not only for heating, but to give a supply of hot water.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details of construction without departing from the spirit thereof or the scope of the appended claims.

In the drawing:

FIGURE 1 is a perspective view of the space heater of the present invention showing the arrangement of the several parts;

FIGURE 2 is a view of the space heater partly in elevation and partly in section taken on the line II—II of FIGURE 1, on a reduced scale; and FIGURE 3 is a top plan view of the fire pot and water jacket.

Referring now more particularly to the drawing in which like reference numerals indicate like portions in the several views, there is shown in FIGURE 1 in perspective, a space heater of the present invention in its preferred form. It consists of a circular main casing 10 having a central opening 11 in the top 12 thereof. The bottom 14 is a solid sheet except for an opening 18 which will later be described, and positions the entire structure on a base of fireproof material 15, such as concrete, fireproof brick or the like. However, since the firebox 16 is separated from the floor by a large water layer, a fireproof base 15 is not necessary except as an abundance of caution. The firebox 16 is a frusto-conical member having a continuous side and base or bottom 17. The base is provided with a concentric aperture 18 leading directly to and connected with an ash discharge passage 20. The top of the firebox 16 is open and coincides with the opening 11 of the main casing. The bottom 17 of the firebox 16 is raised above and spaced from the floor or bottom of the main casing 14. It is supported in any suitable manner on the interior of the main casing 10 by inner support members 29 which are secured in any suitable manner to maintain this position. There is a plurality of spaced radial pipes 21 which provide an open port from the outside of the casing 10 to the firebox 16 adjacent the bottom 17. As will be observed from the sectional portion of FIGURE 2, there is a substantial enclosed chamber 22 between the casing 10 and the firebox 16 which extends completely around the same and under it. This chamber is filled with water and is a water jacket for the firebox 16. In the base 14 of the housing 10, there is a threaded pipe coupling 23 which is the inlet port for water to fill the water jacket 22 and to furnish a constant supply of water. This line is always open to the water supply source. Within the water jacket lining there is a stand pipe 24 which extends through a suitable opening in the base 14 and the support 15, if any is used, supplying hot water for household purposes. Across the opening 18 is a conventional balanced cover plate 25 which can be tipped in place to release ashes into the ash disposal system 20.

Axially aligned with the space heater 10 is a hood 30 connected to a chimney pipe 31. The juncture of the chimney pipe 31 and the top of the circular conical hood 30 may be masked by a collar 32 which not only makes a stronger joint, but covers an otherwise, usually, unsightly juncture. The chimney pipe 31 is a short section suitably telescoping within the flue 33. The hood and its pipe structure 21 are held in position in the flue by a chain 34 attached centrally of the chimney pipe 31 by a spider member 35. The chain 34 may be counterbalanced in any suitable manner so that the hood may be raised or lowered as the operator desires by grasping insulated handles 39. The chimney 31 should be long enough so that the hood may be lowered to completely cover and overlay the top 12 of the main casing 10. This is for the purposes of safety in the event the fire is left unwatched to burn out by itself. The flue 33 is protected by suitable insulating matter 36, particularly at 37 where the chimney 31 goes through the ceiling or roof 38. The chimney 31 may be provided with a damper 40 in the conventional manner for regulating the draft up the flue.

A thermostat 26 within the water jacket is connected to a temperature control device T of conventional form, which in response to settings controls the operation of pump P to circulate hot water from outlet pipe 24 through a piping system for heating or for hot water.

*Operation*

The space heater built in conformity with the above disclosure operates not only as a space heater of exceptional heat-lasting efficiency, but as a source of hot water supply for the household uses and heating. A fire is built in the conventional way within the frusto-conical firebox 16 with the use of solid fuel preferably, although the same may be adapted for using other types of fuels. Combustion air is delivered through the radial tubes 21 directly to the fire. The upward and inwardly sloping sides of the firebox 16 produces a concentrated flame centrally of the hood 30 and all but conceals the remainder of the firebox interior. For some unexplained reason a flame in this type of firebox burns with the appearance of a candle-like flame, and with almost no smoke. A side view of the fire exhibits only a view of the flame and is a very unusual experience. The products of combustion, of course, pass upwardly into the hood 30, to the chimney portion 31 and out through the flue 33.

Before the fire is kindled, the chamber 22 surrounding the firebox is completely filled with water through the inlet port 23, and the direct supply keeps the chamber filled at all times. This is a safety feature as there is no air or steam to cause great expansion, and therefore danger, within the chamber. Obviously, the fire directly heats the water in the chamber 22. Hot water is withdrawn from the chamber 22 through the stand pipe 24 and delivered to faucets or any other place where hot water is needed for household purposes.

As the water becomes heated, it retains its temperature for a considerable period of time due to the large quantity of water in the chamber within the main casing 10. Usually not enough hot water is withdrawn for domestic purposes to alter this characteristic in any great degree. Here again, as water is withdrawn it is immediately replaced to keep the chamber filled with water at all times. The mass of hot water heats the room by induction while the firebox itself heats the room by convection.

It will be observed that all of the objectives of the invention are attained as well as additional objects which will be found by those skilled in this art.

I claim:

1. A space heater comprising in combination a low cylindrical body having a flat top and bottom, said top having an axial opening therethrough, a frusto-conical firebox of smaller diameter supported within said body, said firebox being open at its smaller diameter top registering and joined flush with the axial opening of the body top forming a closed chamber within said body completely surrounding said firebox except at its open top, a plurality of combustion air inlet tubes communicating from adjacent the bottom of the firebox to the atmosphere through the wall of the body, and a circular hood and axial flue adjustably supported above the top of the cylindrical body but spaced therefrom providing an unobstructed transverse space therebetween.

2. The space heater of claim 1 having a water inlet and a separate water outlet communicating with said chamber, said inlet being openly connected at all times to a water supply under pressure to maintain the chamber substantially full of water at all times.

3. The space heater of claim 2 including a pump and wherein the outlet is piped for hot water service, said pump supplying water from said outlet at a positive pressure.

4. A space heater comprising in combination a low cylindrical body having a flat top and bottom, said top having an axial opening therethrough; a frusto-conical firebox of smaller diameter supported within said body, said firebox being open at its smaller end which registers and is joined flush with the opening of the body top to form a closed chamber within said body completely surrounding the firebox except at its open top, a plurality of combustion air tubes communicating from the atmosphere through the body wall to adjacent the bottom of the firebox, a water inlet to said chamber openly connected at all times to a water supply under pressure to maintain the chamber substantially full of water at all times, a water outlet from said chamber for supplying heated water at a positive pressure, and a pump in the water outlet to provide the positive pressure for the outlet water.

5. The combination of claim 4 including a hood and flue adjustably suspended to overhang the cylindrical body to carry off the products of combustion.

6. In a space heater the combination of claim 4 including a hood and flue adjustably suspended over the firebox opening and thermostatic means within said closed chamber initiating the operation of said pump at pre-determined selected temperature settings.

References Cited by the Examiner

UNITED STATES PATENTS

| 346,694 | 8/1886 | Wallace | 126—299 |
|---|---|---|---|
| 579,615 | 3/1897 | Stout | 122—155 |
| 1,994,383 | 3/1935 | Blackburn | 122—158 |
| 2,159,284 | 5/1939 | Miller | 237—8 |
| 2,704,188 | 3/1955 | Bergmann | 237—8 |

FOREIGN PATENTS

| 111,119 | 8/1940 | Australia. |
|---|---|---|
| 569,160 | 1/1924 | France. |
| 64,154 | 9/1892 | Germany. |
| 221,763 | 5/1910 | Germany. |
| 531,172 | 12/1940 | Great Britain. |

OTHER REFERENCES

Hubner, German printed application No. 1,048,003, printed Dec. 31, 1958, 2 pps. spec., 1 sheet dwg. (KL 46c 10/09).

FREDERICK L. MATTESON, JR., *Primary Examiner.*

JAMES W. WESTHAVER, *Examiner.*